United States Patent
Ketels et al.

(10) Patent No.: US 10,279,717 B2
(45) Date of Patent: May 7, 2019

(54) ARMREST

(71) Applicant: Faurecia Automotive Seating, LLC, Auburn Hills, MI (US)

(72) Inventors: Cedric Ketels, Holland, MI (US); Rod Goodrich, Watervliet, MI (US); Robert C Fitzpatrick, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 14 days.

(21) Appl. No.: 15/653,880

(22) Filed: Jul. 19, 2017

(65) Prior Publication Data
US 2018/0022248 A1 Jan. 25, 2018

Related U.S. Application Data

(60) Provisional application No. 62/364,984, filed on Jul. 21, 2016.

(51) Int. Cl.
*A47C 7/54* (2006.01)
*B60N 2/75* (2018.01)
*A47C 1/03* (2006.01)

(52) U.S. Cl.
CPC .............. *B60N 2/777* (2018.02); *B60N 2/75* (2018.02); *B60N 2/753* (2018.02); *B60N 2/763* (2018.02); *B60N 2/767* (2018.02); *A47C 1/03* (2013.01)

(58) Field of Classification Search
CPC .......... B60N 2/75; B60N 2/753; B60N 2/767; B60N 2/763
See application file for complete search history.

(56) References Cited

U.S. PATENT DOCUMENTS

| | | | | |
|---|---|---|---|---|
| 5,232,190 A | * | 8/1993 | Gould | B60N 3/102 248/311.2 |
| 5,380,065 A | * | 1/1995 | Rohrer | A47C 1/03 297/411.35 |
| 5,395,161 A | * | 3/1995 | Spykerman | B60N 2/70 297/411.2 |
| 5,507,556 A | * | 4/1996 | Dixon | B60R 11/0235 297/217.3 |
| 5,536,070 A | | 7/1996 | Lemmen | |
| 5,655,814 A | * | 8/1997 | Gibbs | A47C 1/03 248/118 |
| 5,851,054 A | * | 12/1998 | Bergsten | A47B 21/0371 297/411.35 |
| 5,853,223 A | | 12/1998 | Ritt | |

(Continued)

FOREIGN PATENT DOCUMENTS

EP 1180338 2/2002
EP 1247689 10/2002
(Continued)

OTHER PUBLICATIONS

Extended European Search Report for European App. No. 17182280.2, dated Dec. 6, 2017, 4080 EP II, 8 pages.
(Continued)

*Primary Examiner* — Shin H Kim
(74) *Attorney, Agent, or Firm* — Barnes & Thornburg LLP

(57) ABSTRACT

An occupant support system includes a vehicle seat and an arm support. The vehicle seat supports an occupant in a vehicle while the vehicle is moving. The arm support supports the occupant's arm.

20 Claims, 7 Drawing Sheets

(56) References Cited

U.S. PATENT DOCUMENTS

| | | | | |
|---|---|---|---|---|
| 5,884,976 A * | 3/1999 | Breen | A47C 1/03 | 297/411.35 |
| 5,975,640 A * | 11/1999 | Chen | A47C 1/03 | 297/411.31 |
| 6,017,091 A * | 1/2000 | Cao | A47C 1/03 | 297/411.35 |
| 6,045,191 A * | 4/2000 | Piretti | A47C 1/03 | 297/411.35 |
| 6,059,366 A * | 5/2000 | Hu | B60N 2/75 | 297/411.35 |
| 6,074,012 A * | 6/2000 | Wu | A47C 1/03 | 297/411.26 |
| 6,076,891 A * | 6/2000 | Bernhardt | A47C 1/03 | 297/411.31 |
| 6,086,156 A * | 7/2000 | Breen | A47C 1/03 | 297/411.26 |
| 6,095,598 A * | 8/2000 | Piretti | A47C 1/03 | 297/115 |
| 6,213,556 B1 * | 4/2001 | Chen | A47C 1/03 | 297/411.35 |
| 6,290,300 B1 * | 9/2001 | Sutton | A47C 1/03 | 297/411.35 |
| 6,773,072 B2 * | 8/2004 | Phillips | A47C 1/03 | 248/118 |
| 6,793,281 B2 * | 9/2004 | Duerr | B60N 3/002 | 297/147 |
| 7,452,032 B1 | 11/2008 | Roleder | | |
| 7,695,061 B2 * | 4/2010 | Olarte | A47C 7/70 | 297/162 |
| 7,966,952 B2 * | 6/2011 | Fissette | B64D 11/0007 | 108/115 |
| 8,875,329 B2 * | 11/2014 | Gomez | A61G 13/1235 | 128/845 |
| 9,156,385 B1 * | 10/2015 | Lewis | B60N 2/4606 | |
| 9,828,101 B2 * | 11/2017 | Shih | B64D 11/0646 | |
| 2002/0003361 A1 * | 1/2002 | Duerr | B60N 3/002 | 297/147 |
| 2004/0164577 A1 * | 8/2004 | Shabana | B60N 2/0232 | 296/1.09 |
| 2005/0078230 A1 * | 4/2005 | Alsberg | H04N 5/64 | 348/837 |
| 2007/0200414 A1 * | 8/2007 | Pozzi | B60N 3/001 | 297/411.32 |
| 2009/0045663 A1 * | 2/2009 | Tamakoshi | B60N 2/4235 | 297/411.32 |
| 2009/0256384 A1 | 10/2009 | Hughes, Jr. | | |
| 2011/0012396 A1 * | 1/2011 | Laake | B60N 2/753 | 297/188.14 |
| 2013/0113252 A1 * | 5/2013 | Kuenzler | A47C 7/024 | 297/284.3 |
| 2014/0110975 A1 * | 4/2014 | Tsuchida | B60N 3/002 | 297/135 |
| 2015/0102641 A1 * | 4/2015 | Mendicino | B60N 3/101 | 297/188.14 |
| 2015/0165944 A1 * | 6/2015 | Almeida | B60N 2/4626 | 297/411.31 |
| 2015/0298588 A1 * | 10/2015 | Lorey | B60N 2/773 | 297/411.35 |
| 2015/0314712 A1 * | 11/2015 | Lewis | B60N 2/4606 | 297/411.32 |
| 2016/0088947 A1 * | 3/2016 | McMillan | A47C 7/54 | 297/411.46 |
| 2016/0121766 A1 * | 5/2016 | Yokoyama | B60R 7/043 | 297/188.14 |
| 2016/0159481 A1 * | 6/2016 | Gianakopoulos | B64D 11/00151 | 297/188.04 |
| 2016/0355265 A1 * | 12/2016 | Shih | B64D 11/0646 | |
| 2018/0022248 A1 * | 1/2018 | Ketels | B60N 2/753 | 297/411.37 |

FOREIGN PATENT DOCUMENTS

| | | |
|---|---|---|
| GB | 2010668 | 7/1979 |
| GB | 2520842 | 6/2015 |

OTHER PUBLICATIONS

Irene Kamp, Comfortable and Fun Car Interiors for Passengers, TUDelft, known to applicant at least by Jul. 20, 2016, 28 pages.

* cited by examiner

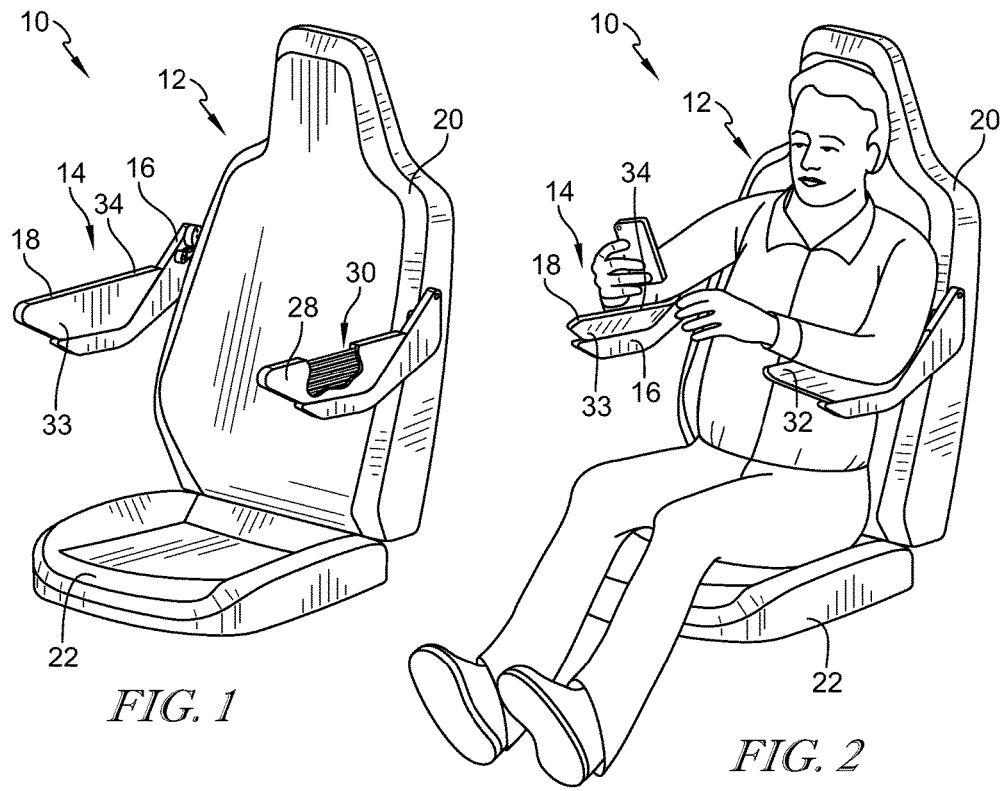
FIG. 1
FIG. 2
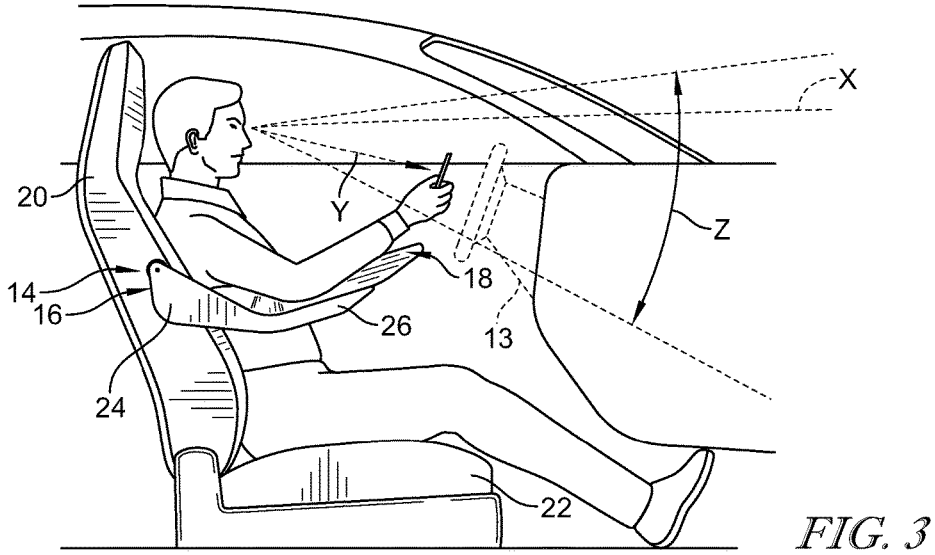
FIG. 3

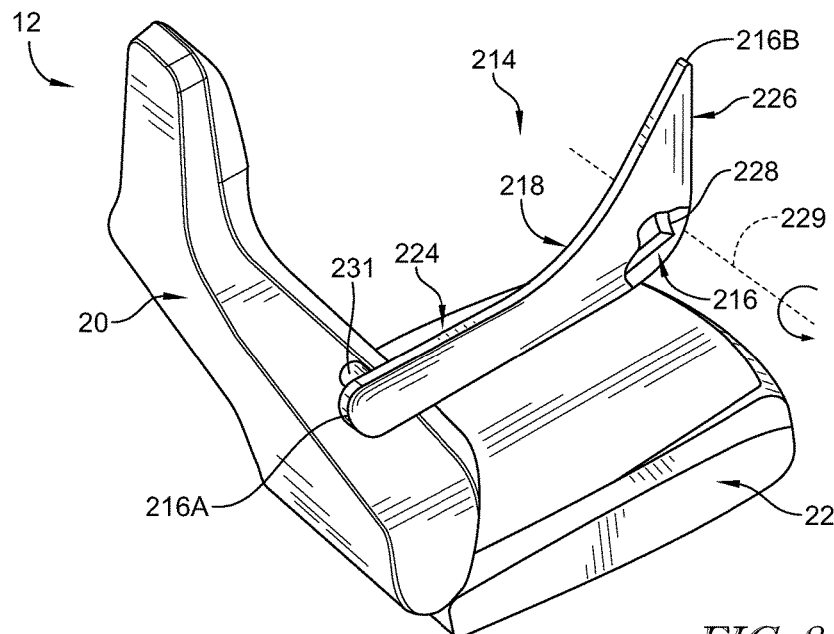
FIG. 8
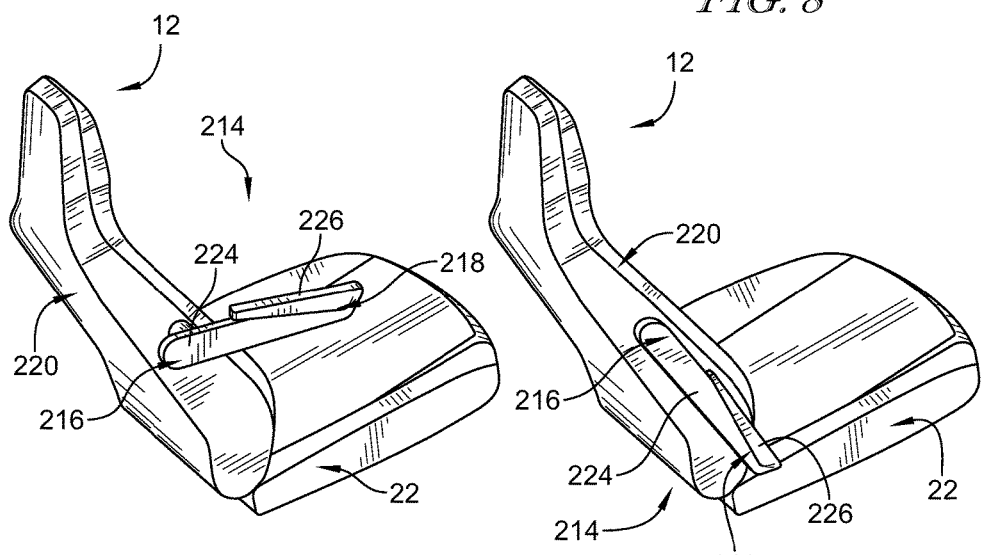
FIG. 9
FIG. 10

ARMREST

PRIORITY CLAIM

This application claims priority under 35 U.S.C. § 119(e) to U.S. Provisional Application Ser. No. 62/364,984, filed Jul. 21, 2016, which is expressly incorporated by reference herein.

BACKGROUND

The present disclosure relates to an occupant support system, and particularly to an occupant support system in a vehicle. More particularly, the present disclosure relates to an arm support included in the occupant support system.

SUMMARY

According to the present disclosure, an occupant support system for use in a vehicle including a vehicle seat and an arm support coupled to the vehicle seat. The vehicle seat is coupled to a floor of the vehicle. The arm support is coupled to a seat back of the vehicle seat and is arranged extend outward away from the seat back.

In illustrative embodiments, the occupant may desire to hold and view an object while the vehicle is moving. While holding and viewing the object, an object line of sight is formed by the occupant's eyes and the object. While the vehicle is moving, a horizontal reference plane is formed by the occupant's eyes and a point along the horizon when the occupant looks toward the horizon. The vehicle seat and the arm support cooperate to provide means for supporting a majority of an occupant's arm on the arm support to cause the horizontal reference plane and the object line of sight to be within a field of view of the occupant. In this arrangement, motion sickness may be mitigated and occupant comfort may be maximized when the occupant is viewing the object and the vehicle is moving. Comfort is also maximized when the vehicle is stationary.

In illustrative embodiments, the armrest includes a rigid frame. The rigid frame is coupled to the seat back to move relative to the seat back. The rigid frame includes an upper arm support and a forearm support. The upper arm support is arranged to extend outward from the seat back. The forearm support is coupled to the upper arm support and is arranged extend outward from the upper arm support.

In illustrative embodiments, the arm support further includes a comfort sling. The comfort sling is deformable and coupled to the rigid frame to move relative to the rigid from between an un-deformed arrangement when not used by an occupant and a deformed arrangement when used by the occupant.

In illustrative embodiments, the rigid frame includes a hinge. The hinge is located between the upper arm support and the forearm support and allows the arm support to move from an expanded configuration to a partially-expanded configuration. The arm support moves from the partially-expanded configuration to a stored configuration when the occupant is not using the arm support.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of an occupant support system including a vehicle seat and an arm support configured to support an arm of an occupant;

FIG. 2 is a perspective view similar to FIG. 1 showing the occupant seated on the vehicle seat and the full arm of the occupant supported on the arm support while the occupant is holding an object;

FIG. 3 is an elevation view showing that the arm support is configured to position the full arm of the occupant upward so that the object and a horizontal reference plane are within an field of view of the occupant causing motion sickness to be mitigated and comfort to be maximized;

FIG. 4A is a side elevation view of the occupant in the neutral body position showing that the neutral body position is defined by a set of joint angle ranges;

FIG. 4B is a front elevation view of the occupant in the neutral body position showing additional joint angles associated with the set of joint angle ranges of the neutral body position;

FIGS. 8-10 are a series of views showing a second embodiment of the arm support in accordance with the present disclosure and suggesting that the arm support is configured to move between an expanded configuration, a partially-expanded configuration, and a stored configuration;

FIG. 8 is a perspective view of the second embodiment of the arm support in the expanded configuration showing that the arm support includes an upper arm support, a forearm support, and a comfort sling extending from the upper arm support toward the forearm support;

FIG. 9 is a view similar to FIG. 8 of the arm support in the partially-expanded configuration showing that the forearm support is configured to pivot along a first hinge so that the forearm support extends back towards the seat back along the upper arm support;

FIG. 10 is a view similar to FIG. 9 of the arm support in the stored configuration showing the upper arm support pivoted downward so that the arm support is stored when not in use;

Figures 14, 15:
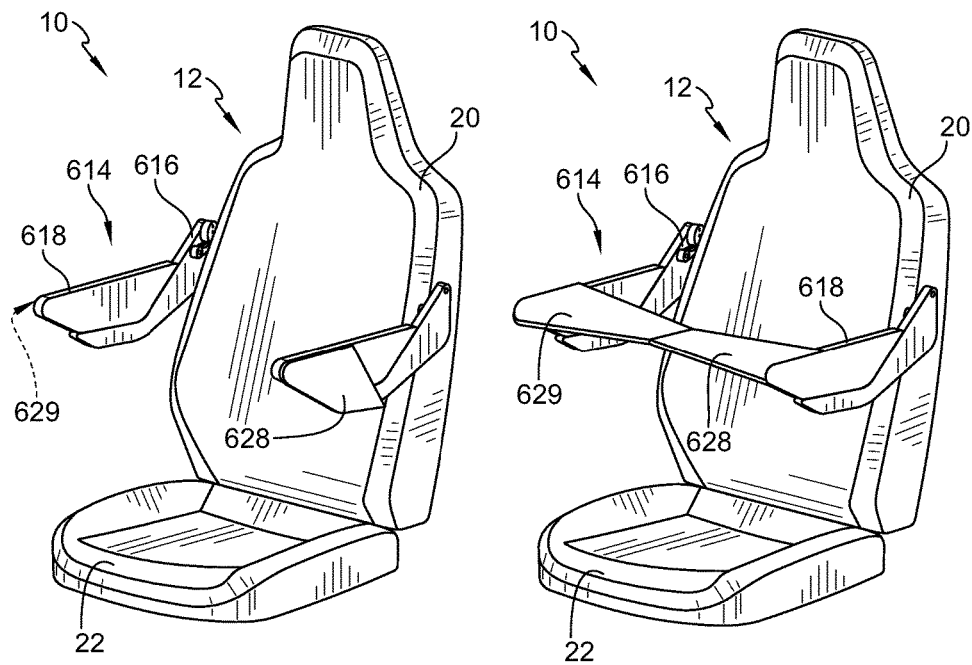

FIG. 14 is a perspective view of an occupant support system similar to the occupant support system shown in FIG. 1 but showing that the occupant support system further includes at least one armrest bridge coupled to an arm support in a stored arrangement; and FIG. 15 is a perspective view similar to FIG. 14 showing that each arm support includes a respective armrest bridge coupled to one another within a space between the arm supports in a deployed arrangement.

DETAILED DESCRIPTION

A vehicle in accordance with the present disclosure includes an occupant support system 10 for use in supporting an occupant within the vehicle as shown in FIGS. 1-3. The occupant support system 10 includes a vehicle seat 12 and an arm support 14 coupled to the vehicle seat 12. The vehicle seat 12 is coupled to a vehicle floor 11 and is configured to support the occupant in various body positions. In one example, the vehicle seat 12 is configured to support the occupant in a neutral body position 100 that generally replicates a natural body position assumed by a human body in zero-gravity conditions as suggested in FIGS. 4A and 4B. The arm support 14 is configured to support the occupant's arms to maximize comfort and mitigate motion sickness experienced by the occupant when the vehicle is moving and the occupant is looking at an object held in the occupant's hand as suggested in FIG. 2.

In one example, the vehicle is moving in the forward direction and the occupant is positioned on the occupant support system to face the forward direction of the vehicle. In another example, the vehicle may be moving in another direction and the occupant is positioned on the occupant support system to face in the direction that the vehicle is moving. In another example, the vehicle may be moving in a first direction and the occupant may be positioned on the occupant support system to face in a second direction that is different from the first direction.

The vehicle seat 12 is configured to support the occupant in the neutral body position to cause a horizontal reference plane X to be established when the occupant is looking in the forward direction as shown in FIG. 3. The horizontal reference plane X is formed by the occupant's eyes and a point along the horizon when the occupant is looking in the forward direction of the vehicle. While in the neutral body position, the occupant's head is pivoted slightly forward to cause the occupant's inner ear cavities and eyes to be generally aligned with the horizontal reference plane X.

When the vehicle is moving in the forward direction, the occupant may wish to view an object that requires the occupant's attention for a long period of time, such as, for example, a cell phone, a tablet, or a book. The arm support 14 is configured to provide means for supporting the occupant's arm on the arm support 14 while the occupant is holding the object and looking at the object and while the vehicle is moving in the forward direction as shown in FIGS. 2 and 3. The occupant's eyes and the object establish an object line of sight Y when the occupant is looking at the object as suggested in FIG. 3. Arm support 14 may be used by passengers riding in the vehicle or by an occupant in the driver's seat while the vehicle is in an autonomous mode as suggested in FIG. 3 by an optional steering wheel.

The arm support 14 further provides means for positioning the occupant's arm while the occupant is holding the object to cause the horizontal reference plane X and the object line of sight Y to be within a field of view Z of the occupant. The field of view Z of the occupant is a peripheral view that extends from the occupant's eyes in the forward direction of the vehicle and toward the object. The field of view Z of the occupant is within a range of about 0 degrees to about 25 degrees from the object line of sight Y. Positioning the occupant's arm so that the horizontal reference plane X and the object line of sight Y are within the field of view Z of the occupant mitigates motion sickness experienced by the occupant while the occupant is viewing the object and the vehicle is moving in the forward direction.

Figure 5:
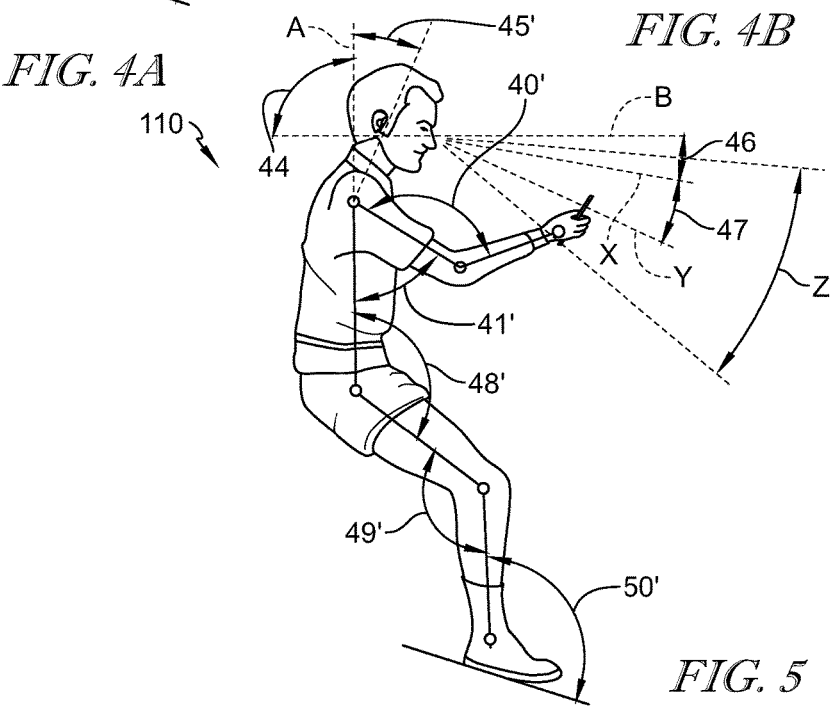
FIG. 5 is a side elevation view of the occupant positioned in a balance position in which the object and the horizontal reference plane are within the field of view of the occupant so that motion sickness is mitigated and comfort is maximized and showing that the balance position is defined by a balance of joint angles that are all within the set of joint angle ranges in the neutral body position.

At the same time, the vehicle seat 12 and the arm support 14 cooperate to support the occupant in the neutral body position as shown in FIG. 3 and suggested in FIG. 5. The vehicle seat 12 positions the occupant's body in the neutral body position to maximize comfort for the occupant. The arm support 14 support's the occupant's arms in the position described above while the occupant is still generally maintained in the neutral body position. Specifically, the arm support 14 maximizes comfort by supporting the occupant's full arm in the neutral body position to provide relief to the occupant's trapezius, neck, and shoulder muscle areas. The arm support 14 provides means for positioning the occupant's arm so that motion sickness is mitigated and occupant comfort is maximized when the occupant is viewing the object and the vehicle is moving in the forward direction.

A first embodiment of the arm support 14, in accordance with the present disclosure, includes a rigid frame 16 and a comfort sling 18 as shown in FIGS. 1-3, 6, and 7. The rigid frame 16 is coupled to a seat back 20 of the vehicle seat 12 and is arranged to extend away from the seat back 20 above a seat bottom 22 of the vehicle seat 12. The comfort sling 18 is deformable and is coupled to the rigid frame 16. The comfort sling 18 is arranged to support the occupant's upper arm and forearm so that a majority of the occupant's arm is supported on the comfort sling 18 and the occupant's elbow is spaced apart from the rigid frame 16. The occupant's elbow is spaced apart from the rigid frame 16 so that the occupant's elbow does not engage the rigid frame 16 causing discomfort when the hard elbow rests on a relatively hard rigid frame 16.

Figure 6:
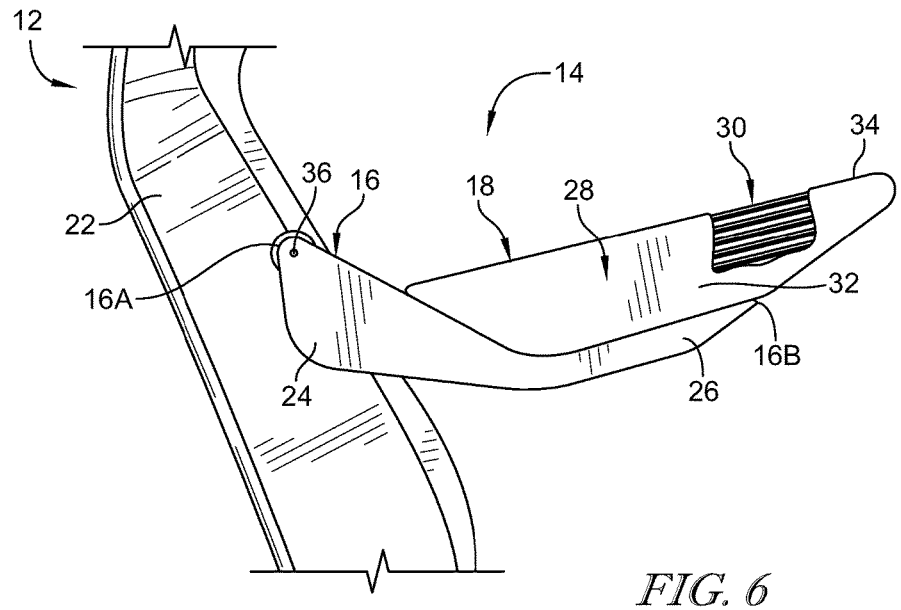
FIG. 6 is a side elevation view of the arm support without the arm of the occupant and showing that arm support includes a rigid frame and a comfort sling.

The rigid frame 16 includes an upper arm support 24 and a forearm support 26 as shown in FIG. 3. In one example, the rigid frame is monolithic or of one-piece constructions. However, the rigid frame may be made of two or more pieces coupled together. The upper arm support 24 is coupled to the vehicle seat 12 at a first end 16A of the rigid frame 16 as shown in FIG. 6. The upper arm support 24 is arranged to extend away from the vehicle seat 12 from the first end 16A of the rigid frame 16. The forearm support 26 is coupled to the upper arm support 24 to locate the upper arm support 24 between the forearm support 26 and the seat back 20. The forearm support 26 is arranged to extend away from the upper arm support 24 and provide a second end 16B of the rigid frame 16. The upper arm support 24 and the lower arm support 26 establish a curved profile between the first end 16A and the second end 16B of the rigid frame 16 when the arm support 14 is viewed from the side as shown in FIGS. 3, 6, and 7.

The comfort sling 18 is arranged to extend from the upper arm support 24 toward the forearm support 26 as shown in FIGS. 1-3, 6, and 7. The comfort sling 18 includes, for example, a soft cushion 28 and a cushion support 30 as shown in FIGS. 1 and 6. In one example, the soft cushion 28 includes an outer trim and a foam core. The cushion support 30 is configured to reinforce the soft cushion 28 and provide an initial un-deformed arrangement of the comfort sling 18 when the occupant is not engaging the comfort sling 18. The soft cushion 28 may be integrated with suitable reinforcement material to combine soft cushion 28 and cushion support 30 into a single material or layer.

The cushion support 30 may be plastic or metallic reinforcement fibers or rods that extend through the center of the comfort sling to rigidify the comfort sling 18 as shown in FIGS. 1 and 6. The reinforcement fibers or rods extend longitudinally along the entire length of the comfort sling 18. However, the fibers or rods may only extend part way through the comfort sling 18. A portion of the comfort sling extends outward away from the forearm support 26 past the second end 16B of the rigid frame 16. However, the comfort sling 18 may be aligned with the rigid frame 16 across the entire length of the comfort sling 18.

Figure 7:
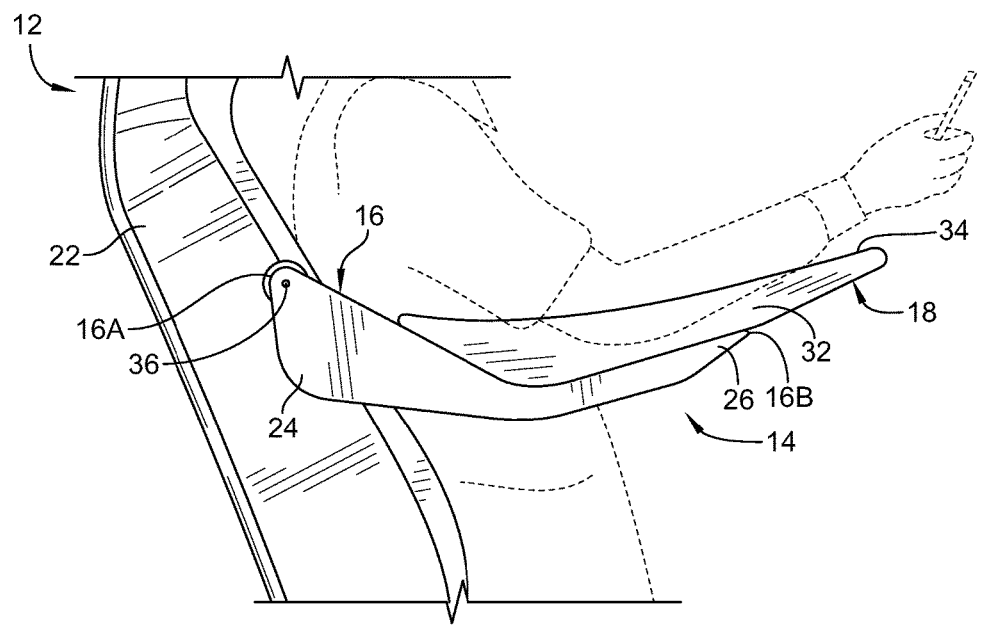
FIG. 7 is a view similar to FIG. 6 showing that the comfort sling is configured to deform inward toward the occupant in response to a load being applied on an outer surface of the comfort sling to support the full arm of the occupant.

The comfort sling 18 is configured to move from the un-deformed arrangement, as shown in FIGS. 1 and 6, to a deformed arrangement, where the occupant's arm applies a load on the comfort sling 18 as shown in FIGS. 2 and 7. In the un-deformed arrangement, the comfort sling 18 extends vertically away from the rigid frame 16 relative to the seat bottom 22. In the un-deformed arrangement a top surface 24 of the comfort sling 18 is generally straight.

In the deformed arrangement, the occupant's arm applies a load to an outer surface 32 of the comfort sling 18. The occupant's arm bends the comfort sling 18 inward toward the occupant so that the outer surface 32 forms a concave surface that abuts and supports the occupant's arm and an inner surface 33 of the comfort sling forms a convex surface with respect to the occupant's arm. The top surface 34 is curved when the occupant's arm applies a load on the outer surface 32 of the comfort sling. The concave surface maximizes the surface area of the comfort sling 18 that engages the occupant's arm, thereby minimizing stress placed on the arm.

Figure 4A:
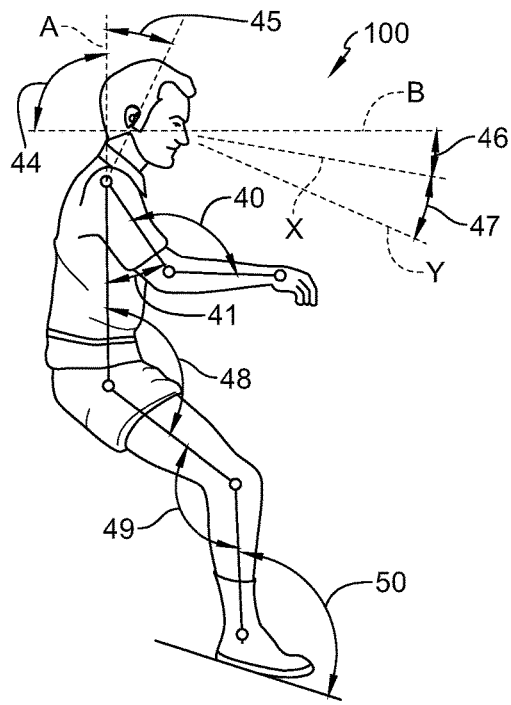
FIGS. 4A and 4B are a series of views of the occupant in a neutral body position that results when the body is exposed to zero or micro-gravity.
Figure 4B:
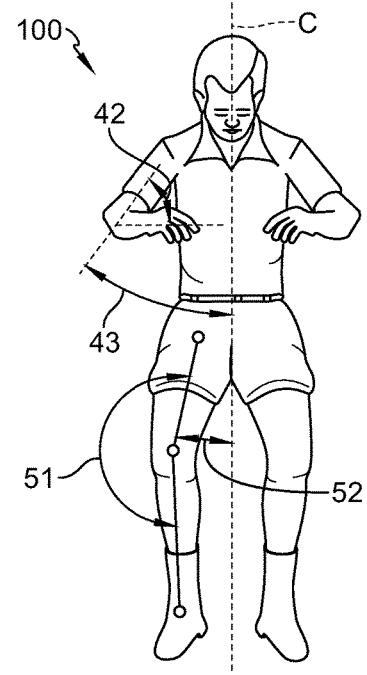

The neutral body position 100 is defined by a set of joint angle ranges 40-52 of the occupant that the occupant would naturally assume in zero-gravity conditions as shown in FIGS. 4A, 4B, and 5. The vehicle seat 12 and the arm support 14 cooperate to position the occupant in a balance position 110 shown in FIG. 5. The balance position 110 generally mimics the neutral body position 100, thereby maximizing comfort for the occupant. However, in the balance position, the joint angles may be slightly adjusted to also mitigate motion sickness while the occupant is holding and viewing an object and the vehicle is moving in the forward direction. The adjusted joint angles in the balance position are a balance of angles within the set of joint angle ranges 40-52.

While in the neutral body position, a first reference axis A is defined by the occupant's shoulders and hips when the occupant is viewed from the side as shown in FIG. 4A. A second reference axis B is generally perpendicular to the first reference axis A and extends through the occupant's eyes. A third reference axis C is defined by a longitudinal centerline of the occupant when the occupant is viewed from above as shown in FIG. 4B.

Angle 40 is defined between the occupant's upper arm and the occupant's forearm when the occupant is viewed from the side as shown in FIG. 4B. In the set of joint angle ranges, angle 40 is within a range of about 98 degrees to about 146 degrees. In the neutral body position, angle 40 is about 122 degrees. In the balance position, angle 40 may be adjusted by arm support 14 to an adjusted joint angle 40' to position the object line of sight Y and the horizontal reference plane X within the field of view Z of the occupant so that motion sickness is mitigated and comfort is maximized.

Angle 41 is defined between the occupant's upper arm and first reference axis A. In the set of joint angle ranges, angle 41 is within a range of about 17 degrees and about 55 degrees. In the neutral body position, angle 41 is about 36 degrees. In the balance position, angle 41 may be adjusted by arm support 14 to adjusted joint angle 41' to position the object line of sight Y and the horizontal reference plane X within the field of view Z of the occupant so that motion sickness is mitigated and comfort is maximized.

Angle 42 is defined between occupant's upper arm and the occupant's forearm when the occupant is viewed from above as shown in FIG. 4B. In the set of joint angle ranges, angle 42 is within a range of about 29 degrees to about 69 degrees. In the neutral body position, angle 42 is about 49 degrees. In the balance position, angle 42 may be adjusted by arm support 14 to position the object line of sight Y and the horizontal reference plane X within the field of view Z of the occupant so that motion sickness is mitigated and comfort is maximized.

Angle 43 is defined between the occupant's upper arm and third reference axis C. In the set of joint angle ranges, angle 43 is within a range of about 28 to about 50 degrees. In the neutral body position, angle 43 is about 39 degrees. In the balance position, angle 43 may be adjusted by arm support 14 to position the object line of sight Y and the horizontal reference plane X within the field of view Z of the occupant so that motion sickness is mitigated and comfort is maximized.

Angle 44 is defined between reference axis A and reference axis B. In the set of joint angle ranges and in the neutral body position, angle 44 is about 90 degrees.

Angle 45 is defined between the occupant's inner ear cavity and reference axis A. In the set of joint angle ranges, angle 45 is within a range of about 19 degrees to about 29 degrees. In the neutral body position, angle 45 is about 24 degrees. In the balance position, angle 45 may be adjusted to adjusted joint angle 45' by vehicle seat 12 to so that arm support 14 and vehicle seat 12 cooperate to position the object line of sight Y and the horizontal reference plane X within the field of view Z of the occupant so that motion sickness is mitigated and comfort is maximized.

Angle 46 is a typical line of sight of the occupant under normal conditions. Angle 46 is about 10 degrees below the reference axis B. In the neutral body position and in the balance position, the line of sight of the occupant under normal conditions is aligned with horizontal reference plane X.

Angle 47 is a typical line of sight of the occupant under zero or micro-gravity conditions. Angle 47 is about 15 degrees below the line of sight of the occupant under normal conditions. In the neutral body position and in the balance position, the line of sight of the occupant under zero or micro-gravity conditions is aligned with the object line of sight Y.

Angle 48 is defined by the occupant's upper legs and the first reference axis A. in the set of joint angle ranges, angle 48 is within a range of about 121 degreed to about 135 degrees. In the neutral body position, angle 48 is about 128 degrees. In the balance position, angle 48 may be adjusted to adjusted joint angle 48' by vehicle seat 12 to so that arm support 14 and vehicle seat 12 cooperate to position the object line of sight Y and the horizontal reference plane X within the field of view Z of the occupant so that motion sickness is mitigated and comfort is maximized.

Angle 49 is defined by the occupant's upper legs and the occupant's lower legs. In the set of joint angle ranges, angle 49 is within a range of about 125 degrees to about 141 degrees. In the neutral body position, angle 49 is about 133 degrees. In the balance position, angle 49 may be adjusted to adjusted joint angle 49' by vehicle seat 12 to so that arm support 14 and vehicle seat 12 cooperate to position the object line of sight Y and the horizontal reference plane X within the field of view Z of the occupant so that motion sickness is mitigated and comfort is maximized.

Angle 50 is defined by the occupant's lower legs and the occupant's feet. In the set of joint angle ranges, angle 50 is within a range of about 105 degrees to about 117 degrees. In the neutral body position, angle 50 is about 111 degrees. In the balance position, angle 50 may be adjusted to adjusted joint angle 50' by vehicle seat 12 to so that arm support 14 and vehicle seat 12 cooperate to position the object line of sight Y and the horizontal reference plane X within the field of view Z of the occupant so that motion sickness is mitigated and comfort is maximized.

Angle 51 is defined by the occupant's upper legs and the third reference axis C. In the set of joint angle ranges, angle 51 is within a range of about 6 degrees to about 18 degrees. In the neutral body position, angle 51 is about 12 degrees. In the balance position, angle 51 may be adjusted by vehicle seat 12 to so that arm support 14 and vehicle seat 12 cooperate to position the object line of sight Y and the horizontal reference plane X within the field of view Z of the occupant so that motion sickness is mitigated and comfort is maximized.

Angle 52 is defined by the occupant's upper legs and the occupant's lower legs when the occupant is viewed from above. In the set of joint angle ranges, angle 52 is within a range of about 190 degrees to about 210 degrees. In the neutral body position, angle 52 is about 200 degrees. In the balance position, angle 52 may be adjusted by vehicle seat 12 to so that arm support 14 and vehicle seat 12 cooperate to position the object line of sight Y and the horizontal reference plane X within the field of view Z of the occupant so that motion sickness is mitigated and comfort is maximized.

The arm support 14 may be pivoted about a hinge 36 to position the occupant's arm in the balance position as shown in FIGS. 5 and 7. In another embodiment, the arm support 14 may slide or translate along seat back 22 to adjust the arm support 14 and position the occupant's arm in the balance position. The arm support 14 may be adjusted by manual movement or powered movement. The arm support 14 is configured to adjust to accommodate about the $5^{th}$ percentile to about the $95^{th}$ percentile of occupant size.

While only arm support 14 is described in detail, a second arm support substantially similar to arm support 14 may be coupled to the vehicle seat 12. As such, occupant support system 10 is configured to support both of the occupant's arms on respective arm supports 14.

A second embodiment of an arm support 214, in accordance with the present disclosure, is shown in FIGS. 8-10. The vehicle seat 12 and the arm support 214 cooperate to position the occupant in the balance position described above with respect to the first embodiment of the arm support 14. The arm support 214 is configured to support an occupant's arms to mitigate motion sickness and maximize comfort while the occupant is holding an object when the arm support 214 is in an expanded configuration as shown in FIG. 8. If the occupant does not wish to use the arm support 214 to mitigate motion sickness and maximize comfort, the arm support 214 may be transformed into a partially-expanded configuration as shown in FIG. 9. In one example, the partially-expanded configuration may be used when the vehicle is not in an autonomous mode of operation and is being controlled by the occupant. If the occupant does not wish to use the arm support 214, the arm support may be arranged into a stored configuration as shown in FIG. 10.

The arm support 214 includes a rigid frame 216 and a comfort sling 218. The rigid frame 216 is coupled to the seat back 20 of the vehicle seat 12. The comfort sling 18 is deformable and is coupled to the rigid frame 216. The comfort sling 218 is arranged to support the occupant's upper arm and forearm so that a majority of the occupant's arm is supported on the comfort sling 218 and the occupant's elbow is spaced apart from the rigid frame 216. The occupant's elbow is spaced apart from the rigid frame 216 so that the occupant's elbow does not engage the rigid frame 216 causing discomfort when the hard elbow rests on a relatively hard rigid frame 216.

The rigid frame 216 includes an upper arm support 224, a forearm support 226, and a hinge 228 as shown in FIG. 8. The upper arm support 224 is coupled to the vehicle seat 12 at a first end 216A of the rigid frame 216. The upper arm support 224 is arranged to extend away from the vehicle seat 12 from the first end 216A of the rigid frame. The forearm support 226 is coupled to the upper arm support 224 to locate the upper arm support 224 between the forearm support 226 and the seat back 20. The hinge 228 is located between upper arm support 224 and forearm support 226.

The forearm support 226 is arranged to extend away from the upper arm support 224 and provide a second end 216B of the rigid frame 216 while in the expanded configuration. The hinge 228 is configured to pivot about a hinge axis 229 to move the arm support 214 from the expanded configuration to the partially-expanded configuration. In the partially-expanded configuration, the forearm support 226 is folded toward the upper arm support 224 along the hinge axis 229 when the occupant is not using the arm support 214 to mitigate motion sickness and maximize comfort. The arm support 214 is configured to pivot downward toward the seat bottom 22 using a second hinge 231 when the arm support 214 is in the stored configuration.

Illustratively, the comfort sling 218 is a fabric cover that covers the rigid frame 216 from the first end 216A to the second end 216B of the rigid frame 216 as shown in FIG. 8. When the arm support 214 is in the expanded configuration, the comfort sling 218 is spaced apart from the hinge 228 and supports the occupant's upper arm and forearm so that a majority of the occupant's arm is supported on the comfort sling 218 and the occupant's elbow is spaced apart from the rigid frame 216. When the arm support 214 is in the partially-expanded configuration and the stored configuration, the comfort sling 218 is sandwiched between the upper arm support 224 and the forearm support 226 as shown in FIGS. 9 and 10.

Although only arm support 214 is discussed in detail, a second arm support substantially similar to arm support 214 is coupled to the vehicle seat 12. As such, occupant support system 10 is configured to support both of the occupant's arms on respective arm supports 214.

Figure 11:
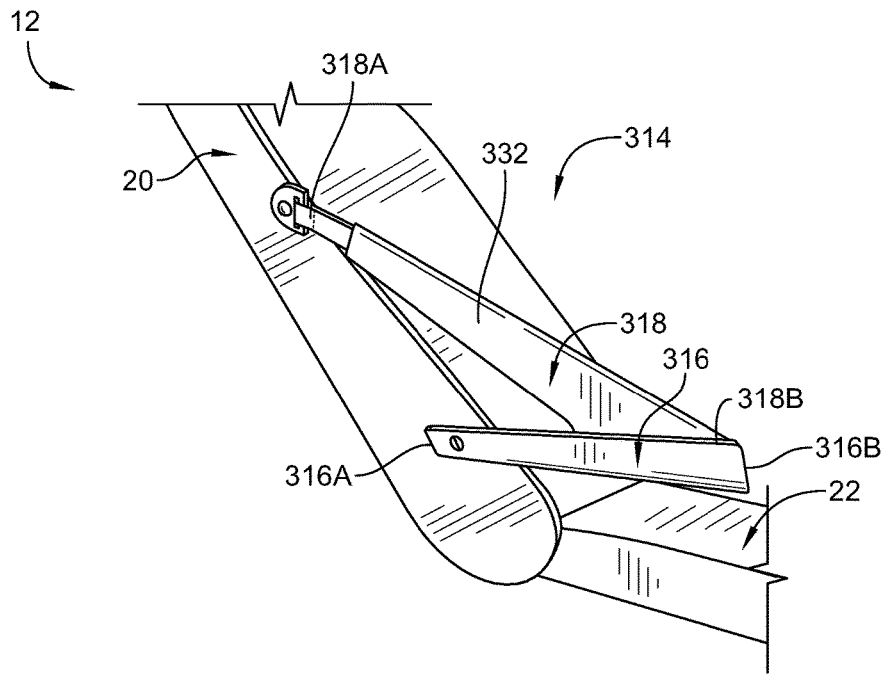
FIG. 11 is a perspective view of a third embodiment of an arm support in accordance with the present disclosure showing that the arm support includes a rigid frame extending outward from the vehicle seat and a comfort sling extending outward from the vehicle seat to the rigid frame.

A third embodiment of an arm support 314, in accordance with the present disclosure, is shown in FIG. 11. The vehicle seat 12 and the arm support 314 cooperate to position the occupant in the balance position described above with respect to the first embodiment of the arm support 14.

The arm support 314 includes a rigid frame 316 and a comfort sling 318. The rigid frame 316 is coupled to a seat back 20 of the vehicle seat 12 and is arranged to extend away from the seat back 20 above the seat bottom 22 of the vehicle seat 12. The comfort sling 318 is deformable and is coupled to the vehicle seat and the rigid frame 316. The comfort sling 318 is arranged to support the occupant's upper arm and forearm so that a majority of the occupant's arm is supported on the comfort sling 318 and the occupant's elbow is spaced apart from the rigid frame 316. The occupant's elbow is spaced apart from the rigid frame 316 so that the occupant's elbow does not engage the rigid frame 316 causing discomfort when the hard elbow rests on a relatively hard rigid frame 316.

The rigid frame 316 includes a first end 316A coupled to the vehicle seat and a second end 316B spaced apart from the first end as shown in FIG. 11. The rigid frame 316 is pivotable about the first end 316A of the rigid frame 316.

The comfort sling 318 includes a first end 318A coupled to the vehicle seat 12 and a second end 318B spaced apart from the first end. The first end 318A of the comfort sling 318 is spaced apart vertically from the first end 316A of the rigid frame 316. The second end 318B of the comfort sling 318 is coupled to the second end 316B of the rigid frame 318.

Comfort sling 318 is configured to move from an un-deformed arrangement to a deformed arrangement, where the occupant's arm applies a load on the comfort sling 318. In the un-deformed arrangement, the comfort sling 18 extends vertically away from the rigid frame 316 relative to the seat bottom 22. In the deformed arrangement, the occupant's arm applies a load to an outer surface 332 of the comfort sling 318. The occupant's arm bends the comfort sling 318 inward toward the occupant so that the outer surface 332 forms a concave surface that abuts and supports the occupant's arm.

In another embodiment, arm support 314 may only include a comfort sling 318. In this situation, the second end 318B of the comfort sling 318 may be attached to a vehicle seat located in front of the vehicle seat 12 or may be attached to a dashboard area of the vehicle. The second end 318B of the comfort sling 318 is coupled to the additional vehicle seat or the dashboard area, such as, for example, by key and slot attachments.

While only arm support 314 is discussed in detail, a second arm support substantially similar to arm support 314 is also coupled to the vehicle seat 12. As such, occupant support system 10 is configured to support both of the occupant's arms on respective arm supports 314.

Figure 12:
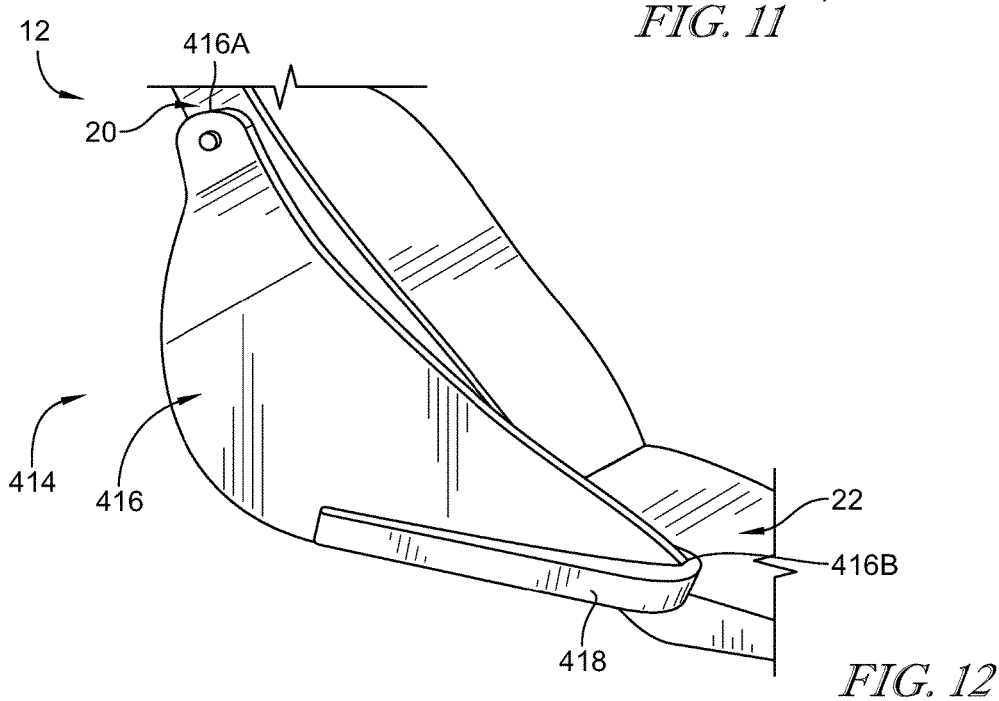
FIG. 12 is a perspective view of a fourth embodiment of an arm support in accordance with the present disclosure showing that the arm support includes a soft frame and a forearm portion.

A fourth embodiment of an arm support 414, in accordance with the present disclosure, is shown in FIG. 12. The vehicle seat 12 and the arm support 414 cooperate to position the occupant in the balance position described above with respect to the first embodiment of the arm support 14.

The arm support 414 includes a soft frame 416 and a forearm support 418. The soft frame 416 is coupled to the seat back 20 of the vehicle seat 12 and is arranged to extend away from the seat back 20 above the seat bottom 22 of the vehicle seat 12. The soft frame 416 is arranged to support the occupant's upper arm and forearm so that a majority of the occupant's arm is supported on the soft frame 416. The forearm support 418 is coupled to the soft frame 416 and extends outward away from the soft frame 416. The forearms support 418 cooperates with a second end 414B of the soft frame 416 to support the occupant's forearm on the arm support 414.

The soft frame 416 is constructed of polyurethane foam or another suitable material. The soft frame 416 has a curved profile when viewed from the side and is configured to pivot about a first end 414A that is coupled to the vehicle seat 12. The curved profile allows a majority of the occupant's arm to rest on the arm support 414 while the arm support 414 positions the occupant's arm upward while the occupant is holding and viewing an object. As such, arm support 414 is configured to position the occupant's arm in the same position described above with respect to the arm support 14.

While only a single arm support 414 is discussed in detail, a second arm support substantially similar to arm support 414 is coupled to the vehicle seat 12. As such, occupant support system 10 is configured to support both of the occupant's arms on respective arm supports 414.

Figure 13:
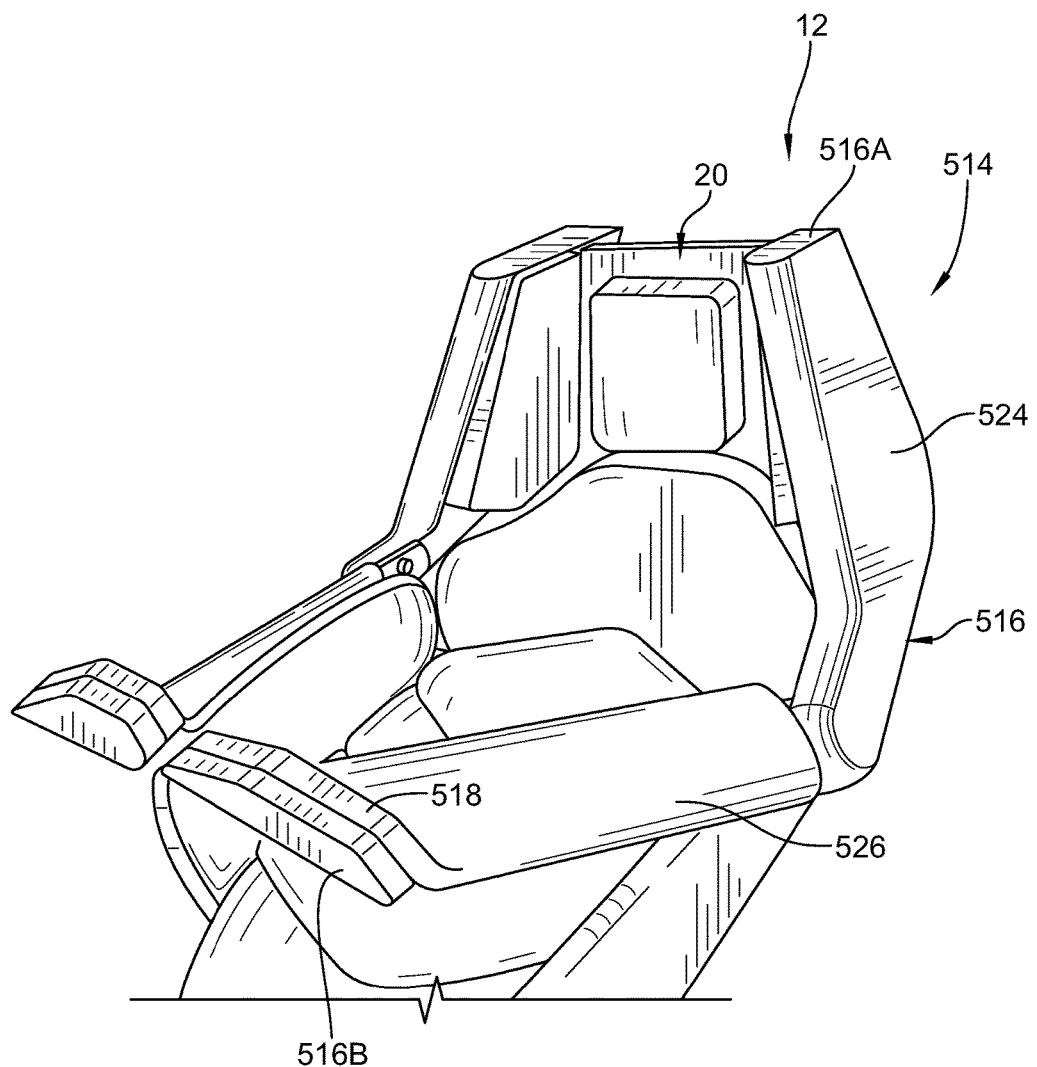
FIG. 13 is a perspective view of a fifth embodiment of an arm support in accordance with the present disclosured.

A fifth embodiment of an arm support 514, in accordance with the present disclosure, is shown in FIG. 13. The vehicle seat 12 and the arm support 514 cooperate to position the occupant in the balance position described above with respect to the first embodiment of the arm support 14.

The arm support 514 includes a rigid frame 516 and a forearm support 518. A first end 516A of the rigid frame 516 is coupled to the seat back 20 of the vehicle seat 12. The rigid frame 516 is arranged to extend away from the seat back 20 above the seat bottom 22 of the vehicle seat 12. The rigid frame 516 is arranged to support the occupant's upper arm and forearm so that a majority of the occupant's arm is supported on the rigid frame 516. The forearm support 518 is coupled to the rigid frame 516 and extends outward away from the rigid frame 516. The forearms support 518 cooperates with a second end 516B of the rigid frame 516 to support the occupant's forearm on the arm support 514.

The rigid frame 516 further includes an upper portion 524 and a lower portion 526. The upper portion 524 is coupled to the vehicle seat and extends downwardly along the seat back 20. The lower portion 526 is coupled to the upper portion and extends outward from the upper portion 524 and the seat back 20. Each of the upper portion 524 and the power portion 526 may be covered in polyurethane foam or another suitable material to increase comfort for the occupant. The upper portion 524 and the lower portion 526 are configured to position the occupant's arm in the same position described above with respect to the arm support 14.

While only a single arm support 514 is discussed in detail, a second arm support substantially similar to arm support 514 is coupled to the vehicle seat 12. As such, occupant support system 10 is configured to support both of the occupant's arms on respective arm supports 514.

Any of the arm supports 14, 214, 314, 414, and 514 described above may further include armrest bridges 628, 629 as shown, for example, in FIGS. 14 and 15 illustrating a sixth arm support 614. Illustratively, the armrest bridges 628, 629 are flexible flaps coupled to a rigid frame 616 or a comfort sling 618 of the arm support 614. A single armrest bridge may stretch from one arm support 614 and couple to the other arm support, or two armrest bridges 628, 629 may stretch from respective arm supports and couple to one another. Other types of suitable armrest bridges are also contemplated herein such as, for example, rigid boards or plates.

The armrest bridges 628, 629 may be integral to one or both armrests and may be detachable. The armrest bridges 628, 629 may be used by the occupant to support an object being viewed by the occupant or may support different parts of the occupant's arms, such as, for example, the occupant's hand or a portion of the occupant's forearm. The armrest bridges 628, 629 are configured to move from a stored arrangement, as shown in FIG. 14, to a deployed arrangement, as shown in FIG. 15.

Both armrest bridges 628, 629 may be coupled together within a space between the arm supports 614 in front of the occupant while in the deployed arrangement as shown in FIG. 15. The armrest bridge 628, 629 are coupled to one another by fastener means including, for example, magnets, Velcro® materials, hooks, or pins. Additionally, each armrest bridge 628, 629 may be detached from one another and folded toward its respective arm support 614 to be stored out of use as shown in FIG. 14. In this situation, the same fastener means described above would also attach the armrest bridge 628, 629 to the arm support 614 when it is stored out of use by the occupant.

An occupant support system for use in a vehicle including a vehicle seat and an arm support coupled to the vehicle seat. The vehicle seat is coupled to a floor of the vehicle. In one example, the arm support is coupled to a seat back of the vehicle seat and is arranged extend outward away from the seat back. In another example, the arm support may be coupled to a seat bottom, to a vehicle door, or to a vehicle console.

The invention claimed is:

1. An occupant support system for use in a vehicle, the occupant support system comprising
   a vehicle seat coupled to a floor of the vehicle to position an occupant to cause a horizontal reference plane defined by the occupant's eyes and a point along the horizon to be established when the occupant is looking at the point along the horizon and
   an arm support coupled to the vehicle seat and configured support an arm of the occupant while the occupant is holding an object and looking at the object to cause an object line of sight between the occupant's eyes and the object to be established and to cause the horizontal reference plane and the object line of sight to be within a field of view of the occupant when the occupant is viewing the object and the vehicle is moving,
   wherein the arm support includes a rigid frame having a first end and a second end, the first end of the rigid frame is coupled to the vehicle seat and includes an upper arm support, the second end of the rigid frame is arranged to extend away from the vehicle seat and includes a forearm support,
   wherein the arm support further includes a comfort sling arranged to extend from the first end of the rigid frame toward the second end of the rigid frame, and
   wherein the comfort sling is movable between an undeformed arrangement in which a top surface of the comfort sling is generally straight and a deformed arrangement in which the occupant's arm provides a load on the comfort sling to cause the top surface to move inward toward the occupant and have a curved shape.

2. The occupant support system of claim 1, wherein the field of view of the occupant includes a peripheral view and the horizontal reference plane is less than about 25 degrees from the object line of sight.

3. The occupant support system of claim 2, wherein the field of view of the occupant includes a peripheral view and the horizontal reference plane is less than about 15 degrees from the object line of sight.

4. The occupant support of claim 1, wherein the comfort sling includes an inner surface arranged to extend downwardly from the top surface toward the seat bottom and face the occupant and an outer surfaced arranged to extend downwardly from the top surface and face opposite the inner surface and the outer surface is configured to engage the occupant's arm when in the deformed arrangement.

5. The occupant support of claim 4, wherein the outer surface has a concave surface arranged to support and engage the occupant's arm when the comfort sling is in the deformed arrangement.

6. The occupant support system of claim 1, wherein the comfort sling is arranged to extend from the upper arm support to the forearm support and the comfort sling is configured to support the full arm of the occupant to cause the occupant's elbow to be spaced apart from the rigid frame.

7. The occupant support system of claim 6, wherein the comfort sling includes a soft cushion and a cushion support and the cushion support includes reinforcement rods that extend through the soft cushion in the longitudinal direction to rigidify the comfort sling.

8. The occupant support system of claim 1, wherein the occupant support system is configured provide means for positioning the occupant's body in a neutral body position to establish a first reference axis defined by the occupant's shoulders and the occupant's hips when the occupant is viewed from the side and to cause the occupant's head to pivot forward so that the occupant's eyes face directly toward the point on the horizon and are aligned with the horizontal reference plane and the horizontal reference plane is less than about 20 degrees from the object line of sight.

9. The occupant support system of claim 8, wherein the arm support positions the occupant's arm so that an angle between the occupant's upper arm and forearm is within a range of about 98 to about 146 degrees and an angle between the occupant's upper arm and the first reference axis is within a range of about 17 degrees to about 55 degrees.

10. The occupant support system of claim 9, wherein the arm support positions the occupant's arm so that the angle between the occupant's upper arm and the occupant's forearm is about 122 degrees and the angle between the occupant's upper arm and the first reference axis is at about 36 degrees.

11. The occupant support system of claim 8, wherein the arm support positions the occupant's upper arm to extend away from the occupant's body at an angle within a range of about 28 to about 50 degrees from a central axis defined by splitting the occupant when the occupant is viewed from above and the forearm support positions the occupant's forearm to extend inward from the occupant's upper arm toward the central axis at an angle within a range of about 29 to about 69 degrees.

12. The occupant support system of claim 11, wherein the arm support positions the occupant's upper arm to extend away from the occupant's body at an angle of about 39 degrees from the central axis and the forearm support positions the occupant's forearm to extend inward from the occupant's upper arm toward the central axis at an angle of about 49 degrees.

13. The occupant support system of claim 1, wherein the arm support is configured to move from an expanded configuration in which the upper arm support is arranged to extend away from the vehicle seat, the forearm support is arranged to extend away from the upper arm support, and a comfort sling is arranged to extend from the first end of the rigid frame to the second end of the rigid frame and is spaced apart from the rigid frame, to a partially-expanded configuration where the forearm support is pivoted inward toward the vehicle seat along a first hinge so that the forearm support rests on the upper arm support and the comfort sling is arranged between the upper arm support and the forearm support.

14. The occupant support system of claim 13, wherein the arm support is configured to move from the partially-expanded configuration to a stored configuration, where the upper arm support is pivoted downward toward a seat bottom of the vehicle seat along a second hinge so that the arm support is aligned with a seat back of the vehicle seat.

15. The occupant support system of claim 1, wherein the arm support further includes a comfort sling extending from the second end of the rigid frame to the vehicle seat and coupled to the vehicle seat in spaced apart relation to the first end of the rigid frame.

16. An occupant support system for use in a vehicle, the occupant support system comprising
a vehicle seat coupled to a floor of the vehicle to position an occupant to cause a horizontal reference plane defined by the occupant's eyes and a point along the horizon to be established when the occupant is looking at the point along the horizon and
an arm support coupled to the vehicle seat and configured to support an arm of the occupant while the occupant is holding an object and looking at the object to cause an object line of sight between the occupant's eyes and the object to be established and to cause the horizontal reference plane and the object line of sight to be within a field of view of the occupant when the occupant is viewing the object and the vehicle is moving,
wherein the arm support includes a rigid frame having a first end and a second end, the first end of the rigid frame is coupled to the vehicle seat and includes an upper arm support, the second end of the rigid frame is arranged to extend away from the vehicle seat and includes a forearm support, and
wherein the rigid frame is configured to pivot about the first end to adjust the arm support and the upper arm support is coupled to the forearm support to cause the rigid frame to establish a curved profile.

17. The occupant support system of claim 16, wherein the curved profile is arranged so that any plane tangent to the upper arm support has a slope relative to the horizontal reference plane that is less than the slope of any plane tangent to the forearm support when the upper arm support is parallel with the horizontal reference plane.

18. The occupant support system of claim 1, wherein the arm support further includes an armrest bridge extending from the second end of the rigid frame, the armrest bridge configured to provide means for supporting the object.

19. The occupant support system of claim 1, wherein the vehicle is moving in a forward direction and the vehicle seat positions the occupant to face in the forward direction.

20. A method of supporting an occupant on a vehicle seat, the method comprising the steps of
positioning the occupant on the vehicle seat to face in a first direction,
providing the occupant with an object in the occupant's hand,
establishing a horizontal reference plane defined by the occupant's eyes and a point along the horizon in the first direction,
establishing an object line of sight between the occupant's eyes and the object, and
supporting the occupant's arms on an arm support to cause the horizontal reference plane and the object line of sight to be within a field of view of the occupant when the occupant is viewing the object,
wherein the arm support includes a rigid frame having a first end and a second end, the first end of the rigid frame coupled to the vehicle seat and including an upper arm support, the second end of the rigid frame extending outward away from the vehicle seat and including a forearm support and the arm support further includes a comfort sling extending from the first end of the rigid frame to the second end of the rigid frame, and
wherein the rigid frame is configured to pivot about the first end to adjust the arm support and the upper arm support is coupled to the forearm support to cause the rigid frame to establish a curved profile.

* * * * *